UNITED STATES PATENT OFFICE.

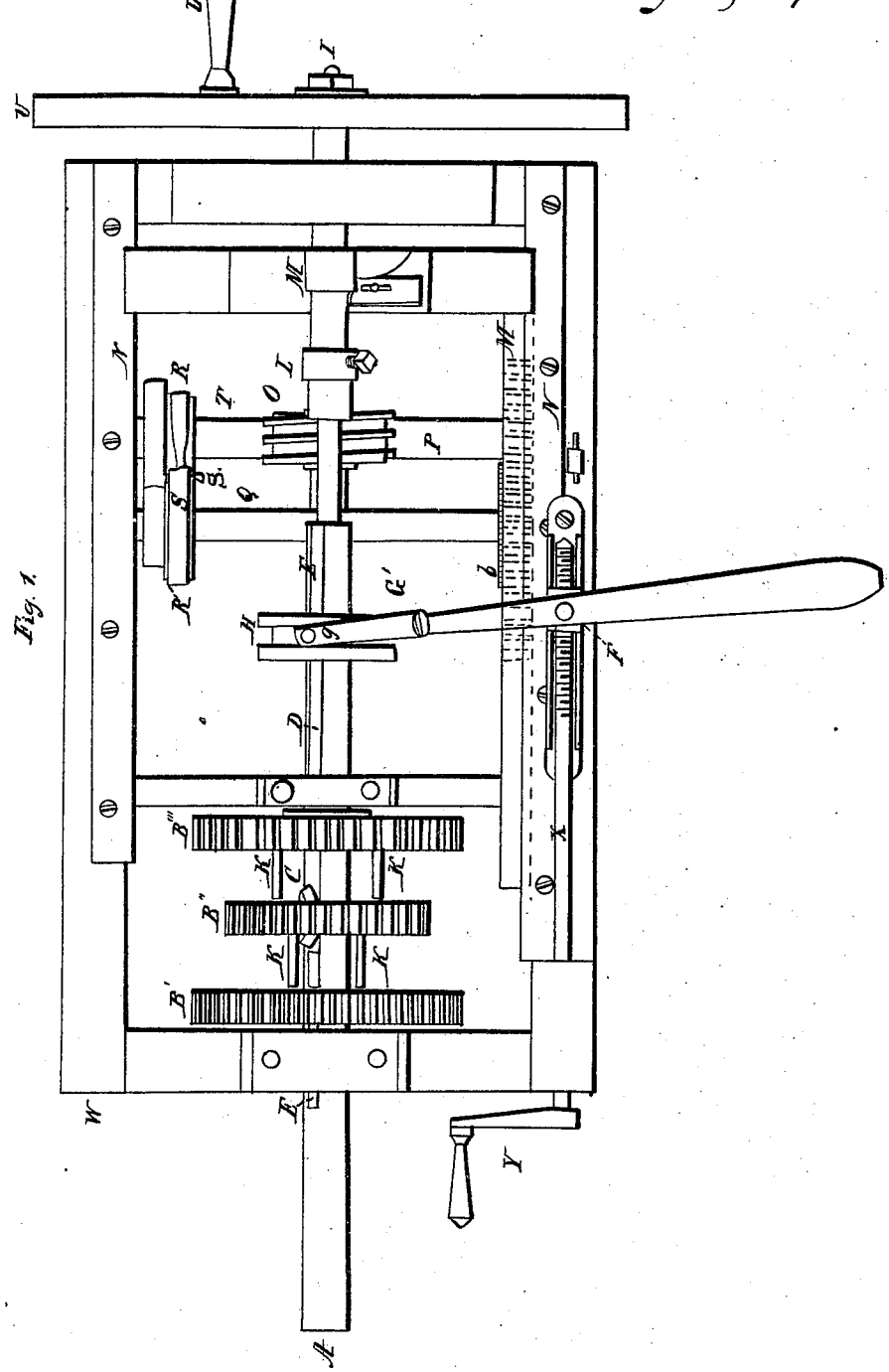

WILBUR M. DAVIS, OF GARDINER, MAINE.

CHANGING GEAR.

Specification of Letters Patent No. 5,192, dated July 17, 1847.

*To all whom it may concern:*

Be it known that I, WILBUR M. DAVIS, of Gardiner, in the county of Kennebec and State of Maine, have invented a new and useful Mode of Changing and Regulating Gear, which is described as follows, reference being had to the annexed drawings of the same, making part of this specification.

Figure 1 is a top view of the machine.

This invention consists in combining with the cylindrical shaft A, on which the cog wheels B′, B″, B‴, loosely turn, a sliding lock plate C, fastened to a sliding bar D, placed and secured in a longitudinal groove E, in the periphery of the revolving shaft A, for the purpose of being thrown longitudinally into a groove, or mortise, made in the cog wheel B′, B″ or B‴ next the eye or central opening therein, in which the shaft, A, turns, by which the said cog wheel is connected to, and caused to turn with, the shaft, by merely moving the lever G, on its fulcrum F, the end of the shorter arm of the lever being made in the shape of a semicircle G′, and connecting the same by round cogs (g) with a grooved collar H, secured to the sliding cylindrical shaft. And by reversing the movement of said lever, again disengaging the shaft from the cog wheel, causing the cog wheel to turn loosely on the shaft. All the cog wheels on the shaft being engaged with, and disengaged from, the shaft in the same way by the attendant, merely taking hold of the lever G, and moving the end to the right, or to the left, during the operation of the machinery, and without stopping the motion of the machinery. The cog wheels B′ B″ B‴ revolve constantly at different degrees of speed, being geared with cog wheels of different diameters on the driving shaft I, below, and when the connecting plate C is brought between two of the cog wheels, the shaft A will be stationary; then by simply moving the lever G, to the right or to the left, the shaft A will become engaged with one of the cog wheels by means of the said plate C and made to revolve with it, at a degree of velocity according to the diameter of the cog wheel, as above stated.

K are pins inserted into the faces of the cog wheels, to keep them at the required distances apart. Rings or collars may be substituted for these pins.

L is a socket in the end of the shaft A, into which the article to be operated on by the cutting tools is fixed—say a treenail to be turned, or a screw to be cut.

M is the carriage containing the cutting tool or tools.

N are ways on which the carriage moves.

O is a worm on the main shaft I, working into a cog wheel on the transverse shaft P, geared to a parallel shaft Q by means of pulleys R and a crossed band S, having a pinion $b$ on the end of the shaft Q, working into a rack $m$ represented by dotted lines on the under side of the carriage, M; for moving it toward the article to be wrought.

U is the crank for turning the main or driving shaft. V is a wheel to which a band from the driving engine may be applied. W is the frame containing the machinery.

X is a screw for changing the position of the fulcrum of the lever G. Y is a crank for turning the said screw X.

I do not claim engaging and disengaging a shaft and cog wheels by a sliding connecting plate, but I merely claim—

The above described mode of changing the speed of the shaft, carrying the article to be wrought during the operation of the machinery, by means of the combination of the pinions B′ B″ B‴ with the shaft A, sliding connecting plate C, rod D, collar H, and lever G, arranged and operated in the manner before described.

WILBUR M. DAVIS.

Witnesses:
NATHL. M. WHITMORE,
T. M. CARLETON.